A. W. L. SCHERMULY.
COUPLING DEVICE.
APPLICATION FILED SEPT. 12, 1919.
1,362,512.
Patented Dec. 14, 1920.
2 SHEETS—SHEET 1.
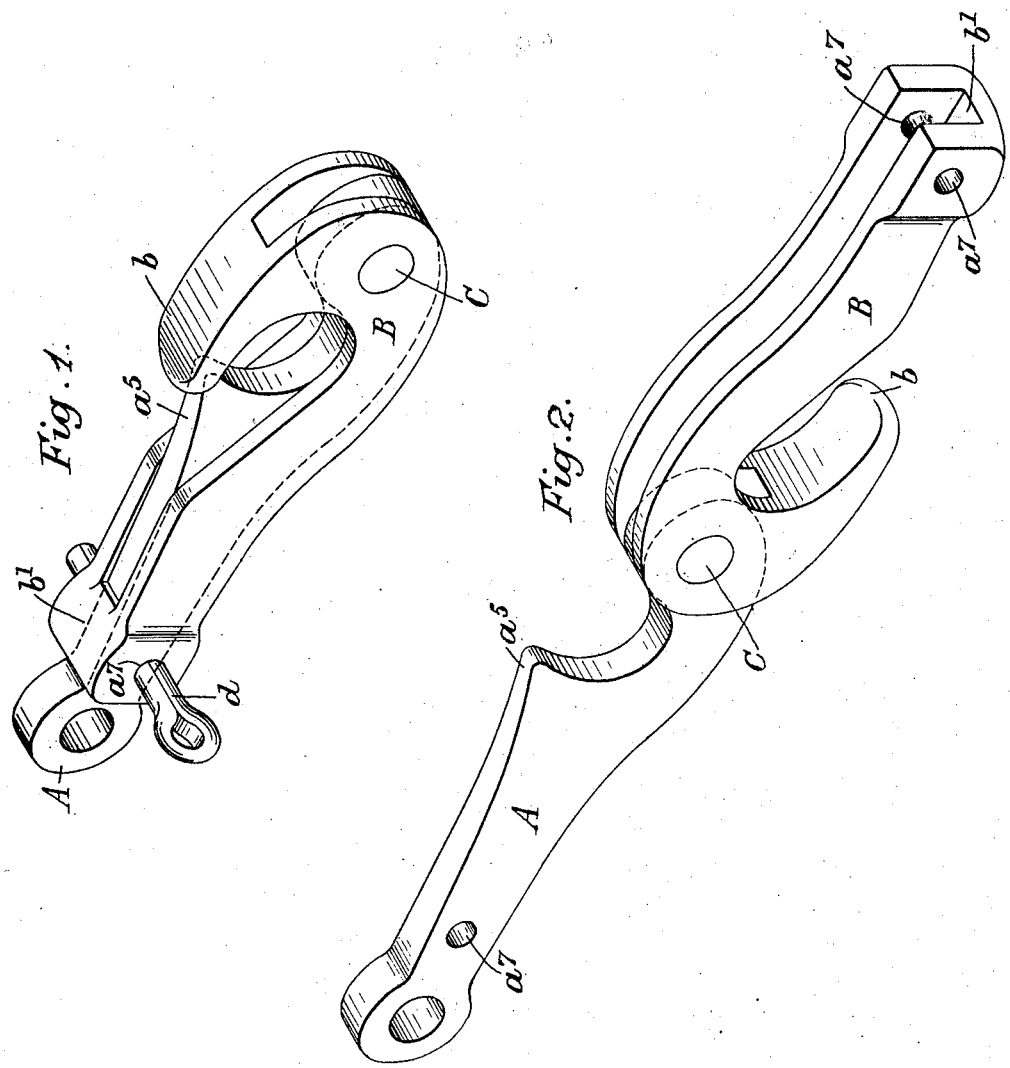

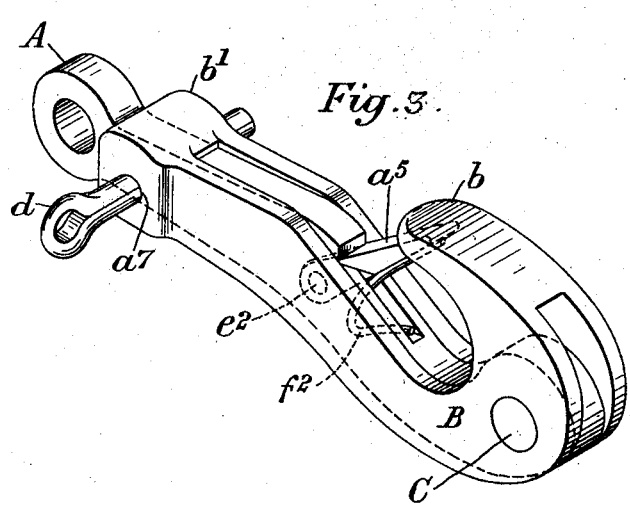

UNITED STATES PATENT OFFICE.

AUGUSTUS WILLIAM LOUIS SCHERMULY, OF SUTTON, ENGLAND.

COUPLING DEVICE.

1,362,512.  Specification of Letters Patent.  Patented Dec. 14, 1920.

Application filed September 12, 1919. Serial No. 323,423.

*To all whom it may concern:*

Be it known that I, AUGUSTUS WILLIAM LOUIS SCHERMULY, a subject of the King of Great Britain, residing at Stonecroft, Stone Cot Hill, Sutton, in the county of Surrey, England, have invented a new and useful Coupling Device, of which the following is a specification.

My invention relates to devices for connecting ropes, chains, bands, or the like, such, for instance, as the ends of wire, or other, ropes, or chains, shroud connections, or the connections by which coverings such as awnings and the like are secured in position and generally for similar purposes in cases where ready and secure means of fastening, or fastening and tightening-up, and rapidity of unfastening are desirable; I will presume, for the purposes of description, that two ropes are to be connected.

The devices to which my invention relates are of the type consisting of, or comprising, two members of which one is attached to one of the two ropes to be connected and the other, or hook-member (for engaging with an eye, loop, or the equivalent, on the other of the two ropes) is hinged to the free end of the first mentioned member, the nose of the hook and the position of the hinge being such that by turning the hook-member, relatively to the other member, the ropes are drawn together and held in this position by the respective members being prevented, by a securing device, from turning upon each other in the reverse direction, while, by the removal of the securing device, the pull of the ropes will cause the hook-member to turn in the reverse direction and the connected rope to slip off the hook.

The device of this type upon which my invention is an improvement consists of, or comprises, a double member having two connected side plates, or cheeks, and a single member hinged between them, this last mentioned, or single, member being formed or furnished, with a hook, the hinge connection being at such a point that when the device is in use the center of the hinge and the short bill of the hook are at opposite sides of the line of strain which tends to release the connection, while each of the side plates, or cheeks, of the double member is provided with a portion which, in conjunction with the hook, will practically encircle the loop of the rope, or the like, when the members are in their securing position.

The object of my invention is to provide simple and easily operated devices of the aforesaid kind which are much stronger than those hitherto constructed and which will insure secure fastening and obviate liability to accidental release of the connection while allowing the connection to be very readily and securely effected when so desired. The devices, according to my invention, having the hook formed in one with both of the side plates or cheeks, of the double member so that the hook is of very much greater strength than is the hook in the hitherto known constructions of such devices.

I will describe, with reference to the accompanying drawings, devices constructed in accordance with my invention.

Figures 1 and 2 show one form of the device, respectively in the closed or securing, position and in the open position; and Fig. 3 illustrates, in perspective, a modification in which the closure of the gap of the hook is effected by a tongue hinged and capable of yielding inward against spring action, so that the loop of the rope or the like, can be readily engaged with the hook, but will not be liable to accidentally leave the hook, while the release of the rope, or the like, when desired is effected very readily and without any manipulation of the said tongue.

Referring first to Figs. 1 and 2; the member B consists of two side plates, or cheeks, $b$, $b^2$, connected by a bridge-piece $b'$ at or toward, one end, and by a hook $b^3$ at the other end; which hook is formed in one with the side plates or cheeks, $b$, $b^2$, and therefore is of much greater strength than is otherwise attainable. The other member A is a single member adapted to fit snugly between the said side plates, or cheeks, $b$, $b^2$, and is hinged thereto by a hinge-pin, C, which is on the side of the line of strain when the device is in use, opposite the side at which the short bill of the hook $b^3$ of the member B is situated. Both members A and B are, so far as is practicable, of similar contour so that when in their securing position, as shown in Fig. 1, one member will not objectionably project beyond the other, and the member A has a portion $a^5$ so shaped that, in conjunction with the hook $b$, the rope-loop or the like, is practically encircled when the parts are in their securing position as shown in Fig. 1, and the loop of the connected rope or the like, is prevented from accidentally slipping from the said hook.

Any suitable pin or equivalent fastening, which can be removed and replaced with facility, is employed, such, for example, as the pin $d$ passed through the holes $a^7$ to retain the two members in their securing, or fastening, position. When the pin $d$, or equivalent fastening, is removed the strain on the hook $b$ will turn the member B into the position shown in Fig. 2, and the loop of the rope or the like, will at once slip away from the short bill of the said hook. The pin $d$ should be connected with the device by a chain, or the like, to prevent its being mislaid or lost.

The hook $b^3$, being formed in one with both the side plates or cheeks $b$, $b'$, is very much stronger than would otherwise be possible, and strength in such a hook is a very important feature when employed where the device is subjected to heavy or sudden strain.

In Fig. 3 the part $a^5$, on the single member A, is capable of turning on a center pin $e^2$, and can yield inward against the action of a spring $f^2$, normally causing the part $a^5$ to close the gap of the hook and prevent the loop of the rope, or the like from slipping from the hook when the parts A and B are secured together in the closed position, while the said loop of rope or the like, can be readily attached as the part $a^5$ yields when either the said loop of the rope or the like, or the device is drawn in the direction to engage the said loop with the hook.

Although I have presumed the devices according to my invention to be applied to the connection of two ropes, it is to be understood that my claims are not limited by the expression "the loop of rope" to that application as my devices may be applied to other analogous purposes; such, for example, as those hereinbefore mentioned, or it may be used for towing purposes, the tow-rope being held by the double or hook member of the device and the other single member of the device being secured to the ship or the like to be towed, the securing being effected in any suitable way, such as by means of a second rope, or any other suitable fastening device; such, for example, as a bolt or shackle.

The modification illustrated in Fig. 3 (while capable of use for similar purposes to those for which the device shown in Figs. 1 and 2 is adapted) is especially suitable for use by parachutists to enable them to readily connect their harness to the tackle of a parachute, and to readily disconnect the harness from the parachute when so desired.

What I claim is:—

1. A coupling device comprising an open hook member having side plates forming a shank therefor, a bar lying between said side plates and hinged to the gap end of the hook at the opposite side of the gap center from the hook bill, said bar having a part coöperating with the hook bill to retain the engaged loop or the like and having at its free end means for attaching thereto a rope end or the like, readily detachable means for securing the bar in folded position within the hook shank, the shape of the hook being such that in reversed position on release, its gap is presented in the direction of strain applied by the rope or the like engaging the hook, the hinged end of the bar being shaped to lie wholly between the shank of the hook so as not to obstruct the hook gap, and the shank of the hook being free from obstructions which might impede the free escape of the rope or the like when the hook is in reversed position on release.

2. In a device in accordance with the preceding claiming clause, a loop-engaging part on the coupling bar comprising a hinged portion which, in conjunction with the hook, will practically encircle the loop of the rope, and a spring device for normally pressing the said portion to the closing position, but which will yield and allow the loop of the rope to be readily engaged with the hook, as hereinbefore explained.

In testimony whereof I have signed my name to this specification in the presence of two subscribing witnesses.

AUGUSTUS WILLIAM LOUIS SCHERMULY.

Witnesses:
   EDWD. GEO. DAVIES,
   ALBERT DAVIS.